United States Patent
Takao et al.

(10) Patent No.: US 8,133,830 B2
(45) Date of Patent: Mar. 13, 2012

(54) SILICON NITRIDE SINTERED COMPACT AND SLIDING MEMBER USING THE SAME

(75) Inventors: Minoru Takao, Yokohama (JP); Michiyasu Komatsu, Yokohama (JP)

(73) Assignees: Kabushiki Kaisha Toshiba, Tokyo (JP); Toshiba Materials Co., Ltd., Yokohama-shi (JP)

( * ) Notice: Subject to any disclaimer, the term of this patent is extended or adjusted under 35 U.S.C. 154(b) by 138 days.

(21) Appl. No.: 12/529,268

(22) PCT Filed: Mar. 11, 2008

(86) PCT No.: PCT/JP2008/000525
§ 371 (c)(1),
(2), (4) Date: Aug. 31, 2009

(87) PCT Pub. No.: WO2008/111307
PCT Pub. Date: Sep. 18, 2008

(65) Prior Publication Data
US 2010/0054652 A1 Mar. 4, 2010

(30) Foreign Application Priority Data
Mar. 15, 2007 (JP) .................. 2007-066461

(51) Int. Cl.
*C04B 35/587* (2006.01)
(52) U.S. Cl. .... 501/97.1; 501/97.2; 384/492; 384/907.1
(58) Field of Classification Search ................. 501/97.1, 501/97.2; 384/492, 907.1
See application file for complete search history.

(56) References Cited

U.S. PATENT DOCUMENTS

| 4,743,571 A * | 5/1988 | Steinmann et al. .......... 501/97.2 |
| 5,525,134 A * | 6/1996 | Mehrotra et al. ............... 51/307 |
| 6,846,765 B2 * | 1/2005 | Imamura et al. ............. 501/97.2 |
| 7,749,932 B2 * | 7/2010 | Fukudome et al. .......... 501/97.2 |

FOREIGN PATENT DOCUMENTS

| JP | 1-093470 A | 4/1989 |
| JP | 3-271164 A | 12/1991 |
| JP | 4-132664 A | 5/1992 |
| JP | 2004-002067 A | 1/2004 |
| JP | 2006-036554 A | 2/2006 |

OTHER PUBLICATIONS

Translation of JP 04-132664, May 6, 1992.*
Japanese Industrial Standard, "High carbon chromium bearing steels," JIS G 4805, Revised Feb. 20, 2008, pp. 1-26, with English translation pp. 1-16.
Japanese Industrial Standard, "Testing methods for fracture toughness of fine ceramics," JIS R 1607, Revised Jan. 4, 1995, pp. 1-15.
Japanese Industrial Standard, "Test methods for hardness of fine ceramics," JIS R 1610, Revised Oct. 20, 2003, pp. 1-24.

* cited by examiner

*Primary Examiner* — Karl Group
(74) *Attorney, Agent, or Firm* — Foley & Lardner LLP

(57) ABSTRACT

A silicon nitride sintered compact contains silicon nitride grains, and a sintering aid component in a range of 2 to 15 mass %. The silicon nitride grains include needle crystal grains each having a long diameter L of 10 μm or less and a ratio (L/S) of the long diameter L to a short diameter S of 5 or more, by 50% or more in area ratio in a crystalline structure of the silicon nitride sintered compact. The silicon nitride sintered compact is used as a sliding member like a bearing ball (2).

8 Claims, 1 Drawing Sheet

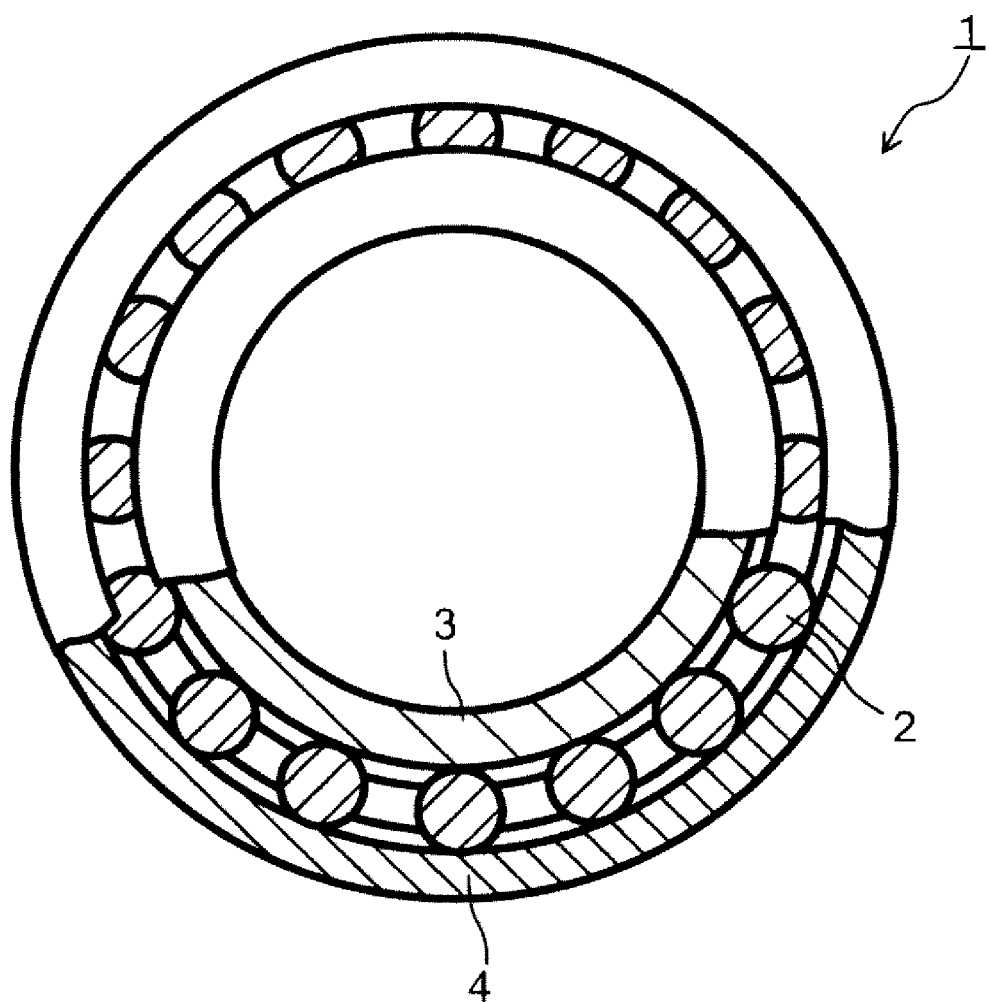

SILICON NITRIDE SINTERED COMPACT AND SLIDING MEMBER USING THE SAME

TECHNICAL FIELD

The present invention relates to a silicon nitride sintered compact and a sliding member using the same.

BACKGROUND ART

Sliding members are used in various fields such as bearing member, various roll materials for rolling, vane for compressor, gas turbine blade, engine parts such as cam roller and so on. For such sliding members, a ceramic material that is lightweight and has high strength is increasingly used. In particular, a silicon nitride sintered compact is excellent in mechanical strength and abrasion resistance and therefore progressively applied to bearing members such as a bearing ball and so on.

For the bearing members such as the bearing ball and so on using the silicon nitride sintered compact, it has been proposed to improve the abrasion resistance and so on represented by the mechanical strength and rolling life, for example, based on control of the sintered compact composition (the kinds, the addition amounts and so on of sintering aids), control of forms of the aid components in the sintered compact, control of manufacturing process and so on (see Patent Reference 1 and 2). Patent Reference 1 describes a silicon nitride sintered compact improved in abrasion resistance by containing TiN grains having an average grain diameter of 0.1 μm or less. Patent Reference 2 describes a silicon nitride sintered compact containing at least one of TiN and TiCN as a Ti compound.

In electronic equipment having a disk medium such as an HDD, DVD or the like, its rotation shaft is rotated at a high speed by a rotation driving apparatus such as a spindle motor to work various disks mounted on the rotation shaft. It is tried that a bearing ball made of a silicon nitride sintered compact that is lightweight and has excellent abrasion resistance is applied to a bearing of the rotation shaft rotated at a high speed. However, conventional bearing balls made of silicon nitride sintered compact have a drawback of large variations in rolling life when used for a bearing of the rotation shaft rotated at a high speed, for example, such as 5000 rpm or more. Therefore, the bearing balls have not necessarily satisfied sufficient reliability and durability.

Patent Reference 1: JP-A 2004-002067 (KOKAI)
Patent Reference 2: JP-A 2006-036554 (KOKAI)

DISCLOSURE OF THE INVENTION

An object of the present invention is to provide a silicon nitride sintered compact whose durability and reliability can be increased with good repeatability by decreasing variations in sliding characteristics represented by the rolling life, and a sliding member using the same.

A silicon nitride sintered compact according to an aspect of the present invention contains silicon nitride grains, and a sintering aid component in a range of not less than 2 mass % and not more than 15 mass %, wherein the silicon nitride grains include needle crystal grains each having a long diameter L of 10 μm or less and a ratio of the long diameter L to a short diameter S (L/S) of 5 or more, in a range of not less than 50% and not more than 80% in area ratio in a crystalline structure of the silicon nitride sintered compact, a maximum diameter of voids existing in the silicon nitride sintered compact is 3 μm or less, and a number of the voids is five or less in a region of 30×30 μm.

A sliding member according to an aspect of the present invention includes a silicon nitride sintered compact containing silicon nitride grains, and a sintering aid component in a range of not less than 2 mass % and not more than 15 mass %, wherein the silicon nitride grains include needle crystal grains each having a long diameter L of 10 μm or less and a ratio of the long diameter L to a short diameter S (L/S) of 5 or more, in a range of not less than 50% and not more than 80% in area ratio in a crystalline structure of the silicon nitride sintered compact, a maximum diameter of voids existing in the silicon nitride sintered compact is 3 μm or less, and the number of the voids is five or less in a region of 30×30 μm.

BRIEF DESCRIPTION OF DRAWING

The FIGURE is a view showing a configuration of a bearing according to an embodiment of the present invention, in a partial sectional view.

EXPLANATION OF NUMERALS

1 ... bearing, 2 ... bearing ball, 3 ... inner ring, 4 ... outer ring

BEST MODE FOR CARRYING OUT THE INVENTION

Hereinafter, an embodiment of the present invention will be described. A silicon nitride sintered compact according to the embodiment of the present invention contains silicon nitride as a main component and sintering aid components in a range of 2 to 15 mass %. The sintering aid components preferably contain at least a rare earth element and aluminum. The rare earth element and aluminum form a grain boundary phase composed of, for example, Si—R—Al—O—N compound (R: rare earth element) to thereby contribute to densification of the sintered compact. As described above, the silicon nitride sintered compact is mainly composed of silicon nitride grains and the grain boundary phase.

The rare earth element as the sintering aid component is not particularly limited, but lanthanoide elements such as yttrium (Y), lanthanum (La), cerium (Ce), samarium (Sm), neodymium (Nd), dysprosium (Dy), erbium (Er) or the like is preferably applied to it. The content of the rare earth element is preferably in a range of 1 to 6 mass %. If the content of the rare earth element is less than 1 mass %, it may be impossible to sufficiently densify the silicon nitride sintered compact. If the content of the rare earth element exceeds 6 mass %, the amount of the grain boundary phase in the silicon nitride sintered compact is excessive, so that the mechanical characteristics such as the strength and so on degrade. The rare earth element is added, for example, as oxide, nitride, boride, carbide, silicide, or the like.

Aluminum as the sintering aid component serves to aid the function of the rare earth element as the sintering accelerator, and added, for example, as aluminum oxide, aluminum nitride or the like. The content of aluminum is preferably in a range of 0.5 to 6 mass %. If the content of aluminum is less than 0.5 mass %, the densification of the silicon nitride sintered compact can be insufficient. If the content of aluminum exceeds 6 mass %, not only the grain boundary phase increases but also the thermal conductivity and the like can decrease because aluminum forms a solid solution in the silicon nitride crystal grains.

The silicon nitride sintered compact may contain a sintering aid component other than the rare earth element and aluminum. The total content of the sintering aid components containing them preferably ranges from 2 to 15 mass %. If the total content of the sintering aid components is less than 2 mass %, it may be impossible to sufficiently densify the silicon nitride sintered compact. If the total content of the sintering aid components exceeds 15 mass %, the characteristics such as the mechanical strength, abrasion resistance and so on which are inherent in the silicon nitride sintered compact can degrade. The content of each of the elements is measured by melting the silicon nitride sintered compact and then chemically analyzing it by ICP.

The silicon nitride sintered compact may further contain at least one kind of metal element M selected from titanium (Ti), zirconium (Zr), hafnium (Hf), tungsten (W), molybdenum (Mo), tantalum (Ta), niobium (Nb), and chromium (Cr) in the form of a simple substance of metal element or a compound of metal elements. The metal element M is more preferably at least one kind selected from Ti, Hf, W and Mo. The metal element M is added in the form of a compound (M compound) of oxide, carbide, nitride, silicide, boride or the like to the silicon nitride sintered compact.

The compound of metal element M (M compound) serves as a sintering aid and an improver for the mechanical characteristics. For example, the M compound can be dispersed in the silicon nitride sintered compact to obtain the dispersion strengthening effect. This makes it possible to improve the mechanical strength and the rolling file of the silicon nitride sintered compact. The content of the metal element M preferably ranges from 0.01 to 5 mass %. A content of the metal element M exceeding 5 mass % can adversely decrease the mechanical strength, the rolling life and soon. The lower limit value of the content of the metal element M is not necessarily defined but is preferably set to 0.01 mass % or more in order to obtain the beneficial addition effect.

As for the crystalline structure of the silicon nitride sintered compact, the β-type formation rate of the silicon nitride grains (crystal grains) is preferably 95% or more. Further, the silicon nitride grains contain needle crystal grains each having a long diameter L of 10 μm or less and a ratio (L/S) of the long diameter L to a short diameter S of 5 or more, by 50% or more in area ratio in a crystalline structure of the silicon nitride sintered compact. By uniforming the needle shapes of the silicon nitride grains as describe above, the densification of the silicon nitride sintered compact can be increased. In other words, it becomes possible to decrease the size and the number of voids existing in the silicon nitride sintered compact. Further, the silicon nitride sintered compact is composed of silicon nitride grains in a needle shape having a large L/S ratio (aspect ratio), whereby the needle crystal grains entwine with each other to make it possible to enhance the strength of the silicon nitride sintered compact.

The long diameter L and the aspect ratio (L/S ratio) of the silicon nitride grain will be measured as follows. First, the surfaces or sections at arbitrary four points in the silicon nitride sintered compact are etched to elute the aid components therein, and enlarged photographs thereof are taken, and the long diameter L and the short diameter S of each of the silicon nitride grains existing in the enlarged photographs are measured. From the measurement results, the area of the needle crystal grains each having the long diameter L of 10 μm or less and the aspect ratio (L/S ratio) of 5 or more is obtained to calculate the rate (%) of the area of the needle crystal grains occupying a measurement area. The average value of the area rates on the measurement surfaces is an area ratio (%) of the needle crystal grains. The enlarged photographs are preferably taken at a magnification of 1000 times or more. In the silicon nitride sintered compact of this embodiment, the area ratios of the needle crystal grains at any locations show similar values.

The needle silicon nitride grains having the long diameter L of 10 μm or less and the aspect ratio (L/S ratio) of 5 or more contribute to the enhancement in denseness and strength. If the long diameter L of the needle crystal grain exceeds 10 μm, the entwined structure becomes complicated, so that voids can easily occur and the abrasion resistance represented by the rolling life can degrade. If the aspect ratio (L/S ratio) of the needle crystal grain is less than 5, it may be impossible to sufficiently obtain the effect of improving the strength and denseness. Accordingly, the silicon nitride grains are uniformed in shape so that the area rate of the needle crystal grains having the long diameter L of 10 μm or less and the aspect ratio (L/S ratio) of 5 or more is 50% or more to enhance the denseness and strength, whereby variations in sliding characteristics represented by the rolling life can be decreased.

If the area rate of the needle crystal grains having the long diameter L of 10 μm or less and the L/S ratio of 5 or more is less than 50%, the size and the amount of voids increase due to nonuniformity in shape of the silicon nitride grains. This easily causes variations in sliding characteristics of the silicon nitride sintered compact. Such a silicon nitride sintered compact cannot increase the durability and reliability with good repeatability. However, if the area rate of the needle crystal grains having the long diameter L of 10 μm or less and the L/S ratio of 5 or more exceeds 80%, the needle crystal grains increase in orientation so that variations in strength may occur depending on the direction of application of pressure. The sliding member such as a bearing ball is required to have isotropic characteristics, and therefore the variations in strength depending on the direction of application of pressure are undesirable. The area rate of the needle crystal grains having the long diameter L of 10 μm or less and the L/S ratio of 5 or more is more preferably in the range of 50 to 70%.

Based on the shape control of the silicon nitride grains, the maximum diameter of the voids existing in the silicon nitride sintered compact can be made 3 μm or less. Further, the number of the voids can be made 5 or less in a region of 30× 30 μm. With the silicon nitride sintered compact having a maximum diameter of void of 3 μm or less and a number of voids of 5 or less in a region of 30×30 μm, not only the value itself of the sliding characteristics represented by the rolling life can be improved, but also the variations in sliding characteristics can be decreased. Accordingly, the durability and reliability when the silicon nitride sintered compact is used as a sliding member can be improved.

It is more preferable to make the maximum diameter of void 2 μm or less. The number of voids in a region of 30× 30 μm is made more preferably 3 or less. The size and the number of voids are obtained by measuring the sizes and the number of pits (corresponding to voids) remaining on a machined surface when grinding, polishing, or lapping is performed on an arbitrary surface or section of the silicon nitride sintered compact. The measurement of voids is performed on surfaces or sections at arbitrary four points, and the size and the number of voids are presented by the average values of the measurements.

The silicon nitride sintered compact of this embodiment satisfies, for example, a hardness in a range of 1300 to 1600 in Vickers hardness Hv, a toughness of 6.0 MPa·m$^{1/2}$ or more in fracture toughness value, a deflective strength of 700 MPa or more in three-point bending strength, and a crushing strength of 150 N/mm$^2$ or more. With the silicon nitride sintered compact having such characteristics, the durability and reliability of the sliding member can be improved. Note that the Vickers hardness shall indicate the result of a test performed with a test load of 198.1 N based on the measuring method specified in JIS-R-1610. The fracture toughness value is measured based on the IF method specified in JIS-R-1607 and calculated by Equation of Niihara. The crushing strength indicates the result of applying a compression weight using an Instron type testing machine according to the old JIS standard B1501 and measuring the load at breakage.

The silicon nitride sintered compact of the above-described embodiment is produced, for example, as follows. First, a silicon nitride powder is prepared. The silicon nitride powder preferably has a content of impurity positive ion elements of 0.3 mass % or less, an oxygen content of 1.5 mass % or less, and α-type silicon nitride of 90 mass % or more. The average grain diameter of the silicon nitride powder is preferably in a range of 0.4 to 0.6 μm. To such a silicon nitride powder, a predetermined amount of the rare earth compound powder and the aluminum compound powder, and the M compound powder (or metal powder) when necessary are added. The average grain diameter of the additive powders such as sintering aid and the like is preferably in a range of 0.6 to 1.2 μm.

Then, the powders are mixed while being ground. It is preferable to apply a bead mill using beads each having a diameter of 0.1 to 2 mm for grinding and mixing the powders. The beads used for the bead mill are preferably beads made of silicon nitride or beads made of zirconia. Note that balls (for example, balls made of alumina) each having a diameter of 5 mm or more (for example, 15 to 20 mm) are used for a ball mill. The beadmill is distinguished from the ball mill based on the diameter of medium (bead or ball) used for grinding and mixing.

The silicon nitride powder and the additive powders are sufficiently mixed while being ground using the bead mill, whereby a raw material mixed powder in which the grain diameter is adjusted in a range of 0.1 to 1.3 μm is obtained. The mixing time by the beadmill is preferably set to one hour per 10 Kg of powder. However, if the mixing time by the bead mill is set too long, the grains become too fine to degrade the handleability and so on of the raw material mixed powder, and therefore the mixing time by the bead mill is preferably set to 5 hours or less per 10 Kg of powder.

By reducing the grain diameter of the raw material mixed powder using the bead mill, the raw material mixed powder can be equalized while improving the function of the sintering aid. Accordingly, the grain growth of the silicon nitride grains is equally promoted, so that the silicon nitride sintered compact having a fine structure having an area rate of 50% or more of the needle crystal grains each having a long diameter L of 10 μm or less and an aspect ratio (L/S ratio) of 5 or more can be obtained with high reproducibility. Note that sieving may be applied as necessary to use a raw material mixed powder having only grain diameters in a predetermined range.

An organic binder and a dispersion medium are added to the above-described raw material mixed powder and all of them are mixed and then compacted into a desired shape by applying a known compacting method such as uniaxial pressing, rubber pressing, CIP (ColdIsostatic Press) or the like. Next, the compact is subjected to degreasing treatment and then sintered at a temperature in a range of 1600 to 2000° C. in an inert atmosphere such as a nitrogen atmosphere, an Ar atmosphere or the like to form a silicon nitride sintered compact. The sintering time is preferably in a range of 3 to 10 hours. For the sintering step, various sintering methods such as pressureless sintering, atmosphere pressure sintering, pressure sintering (hot press), HIP (Hot Isostatic Press) and the like are applicable.

Further, a plurality of methods may be combined, such as HIP processing being performed after pressureless sintering or atmosphere pressure sintering. In particular, in the case where the silicon nitride sintered compact is applied to a bearing member such as a bearing ball, it is effective to perform HIP processing after the pressureless sintering or the atmosphere pressure sintering. The HIP processing is preferably performed by keeping the silicon nitride sintered compact under a pressure of 100 to 200 MPa at a temperature of 1600 to 1900° C. for a predetermined period. For implementing the pressureless sintering or the atmosphere pressure sintering, it is preferable to first perform thermal processing on the compact in a vacuum atmosphere (for example, a vacuum atmosphere of 0.1 MPa or less) to deaerate it and then introduce a nitrogen gas or the like at a temperature in a range of 800 to 1400° C.

The silicon nitride sintered compact of this embodiment is preferable for sliding members such as a bearing member, various roll materials for rolling, vane for compressor, gas turbine blade, engine parts such as cam roller and so on. Among of them, the silicon nitride sintered compact is useful in particular for a bearing member (a rolling element) such as a bearing ball. In addition to them, the silicon nitride sintered compact of the above-describe embodiment can also be used as a heater cover, a cutting tool and the like. The sliding members according to the embodiment of the present invention include bearing ball, roller, vane for compressor, gas turbine blade, cam roller and so on each composed of the silicon nitride sintered compact of the above-describe embodiment.

The FIGURE shows a bearing to which the bearing ball according to the embodiment of the present invention is applied. The bearing 1 shown in the FIGURE has a plurality of bearing balls 2 composed of the silicon nitride sintered compact of the above-described embodiment, and an inner ring 3 and an outer ring 4 which support the bearing balls 2. The inner ring 3 and the outer ring 4 are concentrically arranged about the rotation center. The basic configuration of the bearing 1 is similar to that of a standard bearing. The inner ring 3 and the outer ring 4 are preferably formed of bearing steel such as SUJ2 or the like specified in JIS-G-4805, whereby reliable high-speed rotation can be obtained.

The bearing ball 2 of this embodiment exhibits a rolling life of 600 hours or more when the rolling life is measured under a maximum contact stress of 5.9 MPa, a number of rotations of 1200 rpm, and a mating material of a flat plate made of SUJ2 steel using a thrust-type bearing testing machine. Accordingly, even when a rotation shaft having the bearing 1 attached thereto is rotated at a high speed, the durability and reliability can be maintained in a good condition. Such a bearing 1 is preferably used for various devices whose rotation shafts are rotated at a high-speed, for example, electronic devices such as a magnetic recorder such as an HDD and an optical disk device such as a DVD and so on.

Next, concrete examples of the present invention and their evaluation results will be described.

Example 1

A silicon nitride powder having an oxygen content of 1.3 mass % and an average grain diameter of 0.55 μm was prepared. An yttrium oxide powder having an average grain diameter of 0.7 μm in an amount of 6 mass % and an aluminum oxide powder having an average grain diameter of 0.5

μm in an amount of 6 mass % were added as the sintering aid to the silicon nitride powder. All of them were ground and mixed by the bead mill using beads each having a grain diameter of 0.5 mm. The mixing time by the beadmill was one hour per 10 Kg of powder. The measurement of the grain diameters of the raw material mixed powder prepared as described above shows the grain diameter range of the raw material mixed powder of 0.2 to 1.0 μm. Note that the grain diameters were measured by passing slurry made by dispersing the powder in liquid through a laser beam with a fixed diameter and based on the size of each grain when blocking the laser beam.

Next, a predetermined amount of organic binder was added to the above-described raw material mixed powder and a compact is then produced by the CIP method. The resulting compact was degreased in airflow and then pressureless sintered in a nitrogen atmosphere under a condition of 1750° C.×4h. Further, HIP processing was performed on the pressureless sintered compact at a pressure of 100 MPa under a condition of 1700° C.×1h. In this manner, the objective silicon nitride sintered compact was obtained.

The Vickers hardness, the fracture toughness value, and the deflective strength of the resulting silicon nitride sintered compact were measured. As a result, the Vickers hardness was 1500 (Hv) and the fracture toughness value was 7.0 MPa·m$^{1/2}$. For the deflective strength, 100 samples of 3×4×40 mm were produced and subjected to three-point bending test. As a result, the minimum value of the deflective strength was 800 MPa and the average of the deflective strength was 1000 MPa. When the fine structure of the silicon nitride sintered compact was measured according to the above-described method, it is found that the area rate of the needle crystal grains having the long diameter L of 10 μm or less and the aspect ratio of 5 or more was 50%.

Further, the size and the number of voids in the silicon nitride sintered compact were measured as follows. Surfaces at two points and sections at two points of the silicon nitride sintered compact were arbitrarily selected, and each of the surfaces and sections was subjected to grinding, polishing, or lapping. Each of the machined surfaces was observed by the SEM in a visual field at a magnification of 3000 times, and the size (the maximum value) and the number of pits remaining on each of the machined surfaces. As the average value of them, the maximum diameter and the number of voids were obtained. As a result, the maximum diameter of voids was 1 μm and the number of voids in a region of 30×30 μm was one.

Next, the crushing strength when one silicon nitride ball (bearing ball) having a diameter of 2 mm produced under the same condition was crushed between two flat plates made of SUJ2 steel and the rolling life were measured. The surface of the bearing ball was subjected to surface grinding at a grade 3. The crushing strength was 900 N/mm$^2$.

The rolling life test was performed by rolling 100 bearing balls on a flat plate made of SUJ2 steel in sequence using a thrust-type bearing testing machine. The rolling life was tested under a maximum contact stress of 5.9 GPa and at a number of rotations of 1200 rpm, and the time until peeling appeared on the surface of the bearing ball was measured. As a result, the minimum life time of the bearing ball was 600 hours. Further, the life times of the 100 bearing balls were Weibull-plotted to obtain the Weibull coefficient. The Weibull coefficient of the life time was 5.0 which is excellent value.

Examples 2 to 10

Sintering aid powders and so on were added to the same silicon nitride powder as that in Example 1 to have compositions shown in Table 1, and ground and mixed as in Example 1 to prepare the raw material mixed powders. The grain diameter ranges of the raw material mixed powders are as respectively shown in Table 1.

A predetermined amount of organic binder was added to and mixed with each of the raw material mixed powders, and then they were compacted by the CIP method. The resulting compacts were degreased in airflow and then pressureless-sintered at the same temperature as Example 1. The same HIP processing as in Example 1 was performed on the sintered compacts to obtain the silicon nitride sintered compacts respectively. The characteristics of the silicon nitride sintered compacts were measured as in Example 1. The results are as shown in Table 2 and Table 3.

Comparative Examples 1 to 3

Silicon nitride sintered compacts were produced in the same manner as Example 1 except that the mixing condition and the HIP pressure of the raw material mixed powders were varied. To mix the raw material mixed powders, the ball mill was used. The characteristics of the silicon nitride sintered compacts were measured as in Example 1. The results are as shown in Table 2 and Table 3.

TABLE 1

| | Sintered compact composition (mass %) | | | | Grain diameter range of raw material mixed powder (μm) | HIP pressure (MPa) |
|---|---|---|---|---|---|---|
| | Rare earth element | | | | | |
| | Kind | Content | Al | Other | | |
| Example 1 | Y | 6 | 6 | Ti: 1 | 0.2-1.0 | 100 |
| Example 2 | Y | 5 | 5 | Ti: 2 | 0.2-1.0 | 100 |
| Example 3 | Y | 5 | 5 | Ti: 1 | 0.2-1.0 | 100 |
| Example 4 | Y | 4 | 6 | Ti: 2 | 0.2-1.0 | 100 |
| Example 5 | Y | 4 | 5 | Ti: 2 | 0.2-1.0 | 100 |
| Example 6 | Y | 4 | 5 | Ti: 1 | 0.2-1.0 | 100 |
| Example 7 | Y | 5 | 6 | Ti: 1 | 0.2-1.0 | 100 |
| Example 8 | Er | 5 | 6 | Ti: 1 | 0.2-1.0 | 100 |
| Example 9 | Er | 5 | 5 | Ti: 1 | 0.2-1.0 | 100 |
| Example 10 | Er | 4 | 5 | Ti: 1 | 0.2-1.0 | 100 |
| Comparative Example 1 | Y | 7 | 6 | Ti: 2 | 0.4-1.5 | 100 |
| Comparative Example 2 | Y | 7 | 5 | Ti: 1 | 0.4-1.5 | 100 |
| Comparative Example 3 | Er | 7 | 5 | Ti: 1 | 0.4-1.5 | 100 |

TABLE 2

| | Ratio of needle grains having L of 10 μm or less and L/S of 5 or more (%) | Void | | Deflective strength (MPa) | |
|---|---|---|---|---|---|
| | | Maximum diameter (μm) | Number | Minimum value | Average value |
| Example 1 | 50 | 1 | 1 | 800 | 1000 |
| Example 2 | 53 | 1 | 1 | 850 | 1010 |

TABLE 2-continued

| | Ratio of needle grains having L of 10 μm or less and L/S of 5 or more (%) | Void | | Deflective strength (MPa) | |
|---|---|---|---|---|---|
| | | Maximum diameter (μm) | Number | Minimum value | Average value |
| Example 3 | 51 | 1 | 1 | 900 | 1050 |
| Example 4 | 51 | 1 | 1 | 790 | 1010 |
| Example 5 | 52 | 1 | 1 | 850 | 1040 |
| Example 6 | 53 | 1 | 1 | 910 | 1100 |
| Example 7 | 52 | 1 | 1 | 950 | 1120 |
| Example 8 | 51 | 1 | 1 | 900 | 1100 |
| Example 9 | 51 | 1 | 1 | 880 | 1050 |
| Example 10 | 53 | 1 | 1 | 860 | 1040 |
| Comparative Example 1 | 45 | 3 | 6 | 690 | 810 |
| Comparative Example 2 | 47 | 2 | 7 | 670 | 800 |
| Comparative Example 3 | 45 | 3 | 6 | 680 | 800 |

TABLE 3

| | Bearing ball | | |
|---|---|---|---|
| | Crushing strength (N/mm$^2$) | Rolling life test | |
| | | Minimum life time (h) | Weibull coefficient of life time |
| Example 1 | 900 | 600 | 5.0 |
| Example 2 | 950 | 610 | 5.2 |
| Example 3 | 1000 | 600 | 5.1 |
| Example 4 | 900 | 620 | 5.1 |
| Example 5 | 950 | 615 | 5.2 |
| Example 6 | 1010 | 625 | 5.3 |
| Example 7 | 1000 | 600 | 5.0 |
| Example 8 | 980 | 600 | 5.1 |
| Example 9 | 950 | 610 | 5.2 |
| Example 10 | 970 | 620 | 5.2 |
| Comparative Example 1 | 800 | 430 | 1.7 |
| Comparative Example 2 | 790 | 390 | 1.9 |
| Comparative Example 3 | 810 | 400 | 1.8 |

As is clear from Table 2 and Table 3, any of the silicon nitride sintered compacts according to the examples has an increased denseness and a decreased size and amount of voids. Further, they are excellent in deflective strength and repeatability thereof. As a result of them, it is found that the bearing balls using the silicon nitride sintered compacts according to the examples are excellent in rolling life and having small variations. Therefore, bearing balls excellent in reliability and durability can be provided. When bearings were assembled using the bearing balls respectively and each installed in a spindle motor for electronic equipment and subjected to actual machine test, it was verified that the bearings were excellent in durability of the rotation shafts against the rotation at a high speed.

Examples 11 to 20, Comparative Examples 4 to 8

Sintering aid powders and so on were added to the same silicon nitride powder as that in Example 1 to have compositions shown in Table 4, and ground and mixed to prepare the raw material mixed powders. For Examples 11 to 20, the raw material mixed powders were prepared using the bead mill as in Example 1. For Comparative Examples 4 to 8, the raw material mixed powders were prepared using the ball mill. The mixing times by the bead mill and the ball mill are as shown in Table 5. The grain diameters of the raw material mixed powders prepared as described above were measured. The results are shown in Table 4. Any of the raw material mixed powders in Examples and Comparative Examples has an average grain diameter (D50) was about 0.6 μm, but Comparative Examples contained grains each having a grain diameter greater than 1.0 μm and not greater than 1.5 μm by about 20% (mass ratio).

A predetermined amount of organic binder was added to and mixed with each of the raw material mixed powders, and then subjected to the CIP method to produce an individual compact. The resulting compacts were degreased in airflow and then pressureless-sintered under respective conditions shown in Table 5. HIP processing was performed on the sintered compacts at pressures shown in Table 5. The temperature and time of the HIP processing were the same as those in Example 1. In this manner, the objective silicon nitride sintered compacts were individually produced. The characteristics of the silicon nitride sintered compacts were measured as in Example 1. The results are shown in Table 6 and Table 7.

TABLE 4

| | Sintered compact composition (mass %) | | | | Grain diameter range of raw material mixed powder (μm) |
|---|---|---|---|---|---|
| | Rare earth element | | | | |
| | Kind | Content | Al | Other | |
| Example 11 | Y | 6 | 6 | Ti: 1 | 0.2-1.0 |
| Example 12 | Y | 5 | 5 | Hf: 1 | 0.2-1.0 |
| Example 13 | Y | 5 | 5 | W: 1 | 0.2-1.0 |
| Example 14 | Y | 4 | 6 | Mo: 1 | 0.2-1.0 |
| Example 15 | Y | 4 | 5 | Ti: 1 | 0.2-1.0 |
| Example 16 | Y | 4 | 5 | Hf: 1 | 0.2-1.0 |
| Example 17 | Y | 5 | 6 | Ti: 1 | 0.2-1.0 |
| Example 18 | Er | 5 | 6 | Ti: 1 | 0.2-1.0 |
| Example 19 | Er | 5 | 5 | Hf: 1 | 0.2-1.0 |
| Example 20 | Er | 4 | 5 | Mo: 1 | 0.2-1.0 |
| Comparative Example 4 | Y | 7 | 6 | Ti: 1 | 0.4-1.5 |
| Comparative Example 5 | Y | 7 | 5 | Hf: 1 | 0.4-1.5 |
| Comparative Example 6 | Er | 7 | 5 | Mo: 1 | 0.4-1.5 |
| Comparative | Y | 5 | 5 | Ti: 1 | 0.4-1.5 |

TABLE 4-continued

| | Sintered compact composition (mass %) | | | | Grain diameter range of raw material mixed powder (μm) |
|---|---|---|---|---|---|
| | Rare earth element | | | | |
| | Kind | Content | Al | Other | |
| Example 7 Comparative Example 8 | Y | 4 | 5 | Ti: 1 | 0.4-1.5 |

TABLE 5

| | Mixing time of raw material powder (h) | Primary sintering condition | | HIP pressure (MPa) |
|---|---|---|---|---|
| | | Sintering temperature (° C.) | Maintaining time (h) | |
| Example 11 | 1.0 | 1725 | 4 | 100 |
| Example 12 | 1.0 | 1750 | 6 | 100 |
| Example 13 | 1.5 | 1725 | 4 | 100 |
| Example 14 | 1.5 | 1725 | 6 | 100 |
| Example 15 | 1.5 | 1700 | 6 | 100 |
| Example 16 | 2.0 | 1700 | 4 | 100 |
| Example 17 | 2.0 | 1700 | 6 | 100 |
| Example 18 | 2.0 | 1700 | 8 | 100 |
| Example 19 | 5.0 | 1700 | 4 | 100 |
| Example 20 | 5.0 | 1700 | 6 | 100 |
| Comparative Example 4 | 8.0 | 1750 | 6 | 100 |
| Comparative Example 5 | 8.0 | 1750 | 4 | 100 |
| Comparative Example 6 | 8.0 | 1750 | 4 | 100 |
| Comparative Example 7 | 16.0 | 1700 | 6 | 150 |
| Comparative Example 8 | 16.0 | 1700 | 4 | 150 |

TABLE 6

| | Ratio of needle grains having L of 10 μm or less and L/S of 5 or more | Void | | Deflective strength (MPa) | |
|---|---|---|---|---|---|
| | | Maximum diameter (μm) | Number | Minimum value | Average value |
| Example 11 | 60 | 2 | 3 | 800 | 1000 |
| Example 12 | 65 | 1 | 5 | 850 | 1010 |
| Example 13 | 53 | 2 | 4 | 900 | 1050 |
| Example 14 | 55 | 1 | 2 | 790 | 1010 |
| Example 15 | 62 | 1 | 2 | 850 | 1040 |
| Example 16 | 62 | 0 | 0 | 950 | 1120 |
| Example 17 | 57 | 0 | 0 | 910 | 1100 |
| Example 18 | 56 | 2 | 4 | 900 | 1100 |
| Example 19 | 59 | 1 | 1 | 880 | 1050 |
| Example 20 | 63 | 2 | 3 | 860 | 1040 |
| Comparative Example 4 | 45 | 4 | 6 | 690 | 810 |
| Comparative Example 5 | 47 | 5 | 7 | 670 | 800 |
| Comparative Example 6 | 45 | 4 | 6 | 680 | 800 |
| Comparative Example 7 | 46 | 4 | 6 | 685 | 820 |
| Comparative Example 8 | 47 | 5 | 6 | 690 | 810 |

TABLE 7

| | Crushing strength (N/mm²) | Bearing ball Rolling life test Minimum life time (h) | Weibull coefficient of life time |
|---|---|---|---|
| Example 11 | 900 | 600 | 5.0 |
| Example 12 | 950 | 610 | 5.2 |
| Example 13 | 1000 | 600 | 5.1 |
| Example 14 | 900 | 620 | 5.1 |
| Example 15 | 950 | 615 | 5.2 |
| Example 16 | 1000 | 600 | 5.0 |
| Example 17 | 1010 | 625 | 5.3 |
| Example 18 | 980 | 600 | 5.1 |
| Example 19 | 950 | 610 | 5.2 |
| Example 20 | 970 | 620 | 5.2 |
| Comparative Example 4 | 800 | 430 | 1.7 |
| Comparative Example 5 | 790 | 390 | 1.9 |
| Comparative Example 6 | 810 | 400 | 1.8 |
| Comparative Example 7 | 850 | 550 | 2.5 |
| Comparative Example 8 | 860 | 560 | 2.7 |

As is clear from Table 6 and Table 7, any of the silicon nitride sintered compacts according to the examples has an increased denseness and a decreased size and amount of voids. Further, they are excellent in deflective strength and repeatability thereof. As a result of them, it is found that the bearing balls using the silicon nitride sintered compacts according to the examples are excellent in rolling life and having small variations. Therefore, bearing balls excellent in reliability and durability can be provided. When bearings were assembled using the bearing balls respectively and each installed in a spindle motor for electronic equipment and subjected to actual machine test, it was verified that the bearings were excellent in durability of the rotation shafts against the rotation at a high speed.

Examples 21 to 28, Comparative Examples 9 to 14

Sintering aid powders and so on were added to the silicon nitride powders to have the same composition as that in Example 1, and ground and mixed using the bead mill as in Example 1 to prepare the raw material mixed powders. However, the respective times shown in Table 8 were applied to the mixing times by the beadmill. The grain diameter ranges of the raw material mixed powders according to Examples and Comparative Examples are as shown in Table 8.

A predetermined amount of organic binder was added to and mixed with each of the raw material mixed powders, and then subjected to the CIP method to produce an individual compact. The resulting compacts were degreased in airflow and then pressureless-sintered (primary sintering) under respective conditions shown in Table 8. Further, HIP processing (secondary sintering) was performed on the sintered compacts under conditions shown in Table 8. The HIP pressure was set to 100 MPa. In this manner, the objective silicon nitride sintered compacts were individually produced. The characteristics of the silicon nitride sintered compacts were measured as in Example 1. The results are shown in Table 9.

TABLE 8

| | Mixing time of raw material powder (h) | Grain diameter range of raw material mixed powder (μm) | Primary sintering condition Sintering temperature (°C) | Primary sintering condition Maintaining time (h) | Secondary sintering (HIP) condition Sintering temperature (°C) | Secondary sintering (HIP) condition Maintaining time (h) |
|---|---|---|---|---|---|---|
| Example 1 | 1.0 | 0.2-1.0 | 1750 | 4 | 1700 | 1 |
| Example 21 | 1.0 | 0.2-1.0 | 1725 | 4 | 1700 | 2 |
| Example 22 | 1.0 | 0.2-1.0 | 1750 | 6 | 1725 | 1 |
| Example 23 | 1.5 | 0.2-0.9 | 1725 | 4 | 1700 | 1 |
| Example 24 | 1.5 | 0.2-0.9 | 1725 | 6 | 1700 | 2 |
| Example 25 | 1.5 | 0.2-0.9 | 1700 | 6 | 1675 | 2 |
| Example 26 | 2.0 | 0.2-0.8 | 1700 | 4 | 1675 | 2 |
| Example 27 | 2.0 | 0.2-0.8 | 1700 | 6 | 1675 | 1 |
| Example 28 | 5.0 | 0.1-0.7 | 1700 | 5 | 1650 | 1 |
| Comparative Example 9 | 0.5 | 0.4-1.3 | 1775 | 4 | 1750 | 2 |
| Comparative Example 10 | 0.5 | 0.4-1.3 | 1800 | 4 | 1750 | 1 |
| Comparative Example 11 | 0.5 | 0.4-1.3 | 1800 | 6 | 1750 | 1 |
| Comparative Example 12 | 0.8 | 0.2-1.2 | 1750 | 15 | 1700 | 2 |
| Comparative Example 13 | 0.8 | 0.2-1.2 | 2100 | 4 | 1750 | 2 |
| Comparative Example 14 | 0.8 | 0.2-1.2 | 1775 | 1 | 1750 | 1 |

TABLE 9

| | Ratio of needle grains having L of 10 μm or less and L/S of 5 or more | Void Maximum diameter (μm) | Void Number | Deflective strength (MPa) Minimum value | Deflective strength (MPa) Average value |
|---|---|---|---|---|---|
| Example 1 | 50 | 1 | 1 | 800 | 1000 |
| Example 21 | 56 | 2 | 3 | 780 | 980 |

TABLE 9-continued

|  | Ratio of needle grains having L of 10 μm or less and L/S of 5 or more | Void | | Deflective strength (MPa) | |
|---|---|---|---|---|---|
|  |  | Maximum diameter (μm) | Number | Minimum value | Average value |
| Example 22 | 61 | 1 | 2 | 790 | 990 |
| Example 23 | 58 | 1 | 2 | 815 | 1050 |
| Example 24 | 59 | 0 | 0 | 820 | 1100 |
| Example 25 | 57 | 2 | 2 | 830 | 1090 |
| Example 26 | 62 | 0 | 0 | 850 | 1120 |
| Example 27 | 55 | 0 | 0 | 860 | 1110 |
| Example 28 | 54 | 1 | 1 | 850 | 1050 |
| Comparative Example 9 | 45 | 5 | 4 | 690 | 800 |
| Comparative Example 10 | 47 | 4 | 6 | 695 | 820 |
| Comparative Example 11 | 44 | 4 | 4 | 670 | 810 |
| Comparative Example 12 | 30 | 7 | 6 | 600 | 720 |
| Comparative Example 13 | 35 | 15 | 20 | 500 | 550 |
| Comparative Example 14 | 41 | 10 | 8 | 560 | 650 |

As is clear from Table 9, the raw material mixed powders made by the mixing times by the bead mill in a range of 1 to 5 hours per 10 Kg of powder are stable in grain diameter range on a fine side, as a result of which the raw material mixed powders are excellent in controllability of the fine structure of the silicon nitride sintered compacts. In contrast, relatively large grains exist in the raw material mixed powders in Comparative Examples 9 to 11 having insufficient mixing times by the bead mill, so that the ratio of needle crystal grains each having a long diameter L of 10 μm or less and an aspect ratio of 5 or more is decreased. In Comparative Example 12 in which the primary sintering time is too long, the grains excessively grow to increase the ratio of the needle crystal grains each having a long diameter L greater than 10 μm. Also in Comparative Example 13 in which the primary sintering temperature is too high, the grains excessively grow to increase the ratio of the needle crystal grains each having a long diameter L greater than 10 μm. In Comparative Example 14 in which the primary sintering time is too short, the sintering is insufficient, as a result of which the grain growth is insufficient to increase voids.

INDUSTRIAL APPLICABILITY

The silicon nitride sintered compact according to the aspect of the invention is increased in repeatability of the sliding characteristics by controlling the shape of the silicon nitride grains. Accordingly, the silicon nitride sintered compact excellent in durability and reliability and the sliding member composed of the silicon nitride sintered compact can be provided with high reproducibility.

What is claimed is:

1. A sliding member comprising:
a silicon nitride sintered compact containing silicon nitride grains, and a sintering aid component in a range of not less than 2 mass % and not more than 15 mass %,
wherein the silicon nitride grains include needle crystal grains each having a long diameter L of 10 μm or less and a ratio of the long diameter L to a short diameter S (L/S) of 5 or more, wherein an area ratio of the needle crystal grains in a crystalline structure of the silicon nitride sintered compact is in a range of not less than 50% and not more than 80%,
wherein a maximum diameter of voids existing in the silicon nitride sintered compact is 3 μm or less,
wherein a number of the voids is five or less in a region of 30×30 μm, and
wherein the sliding member is a bearing ball.

2. The sliding member according to claim 1, wherein the silicon nitride sintered compact contains a rare earth element in a range of not less than 1 mass % and not more than 6 mass % and Al in a range of not less than 0.5 mass % and not more than 6 mass % as the sintering aid component.

3. The sliding member according to claim 2, wherein the silicon nitride sintered compact further contains at least one of a metal element selected from Ti, Zr, Hf, W, Mo, Ta, Nb and Cr as a simple substance of the metal element or a compound of the metal element in a range of not less than 0.01 mass % and not more than 5 mass %.

4. The sliding member according to claim 1, wherein the bearing ball has a rolling life of 600 hours or more when the rolling life is measured by a thrust-type bearing testing machine under conditions of a maximum contact stress of 5.9 MPa and a number of rotations of 1200 rpm.

5. The sliding member according to claim 1, wherein the area ratio of the needle crystal grains in the crystalline structure is in a range of not less than 50% and not more than 70%.

6. The sliding member according to claim 1, wherein the maximum diameter of the voids is 2 μm or less.

7. The sliding member according to claim 1, wherein the number of the voids is three or less in the region of 30×30 μm.

8. The sliding member according to claim 1, wherein the sliding member has an oxygen content of 1.5 mass % or less.

* * * * *